United States Patent
Goldberg et al.

(10) Patent No.: US 6,975,792 B1
(45) Date of Patent: Dec. 13, 2005

(54) METHOD AND APPARATUS FOR COUPLING LIGHT INTO A WAVEGUIDE USING A SLIT

(75) Inventors: Lew Goldberg, Fairfax, VA (US);
Christopher M. McIntosh, Fairfax, VA (US)

(73) Assignee: Keopsys, Inc., Fairfax, VA (US)

( * ) Notice: Subject to any disclaimer, the term of this patent is extended or adjusted under 35 U.S.C. 154(b) by 70 days.

(21) Appl. No.: 10/290,393

(22) Filed: Nov. 8, 2002

Related U.S. Application Data

(60) Provisional application No. 60/331,149, filed on Nov. 9, 2001.

(51) Int. Cl.[7] .................................................. G02B 6/26

(52) U.S. Cl. ........................................... 385/31; 385/15

(58) Field of Search .............................. 385/14, 31, 49, 385/88–94, 15

(56) References Cited

U.S. PATENT DOCUMENTS

| | | | | |
|---|---|---|---|---|
| 5,854,865 A | * | 12/1998 | Goldberg | 385/31 |
| 6,477,295 B1 | * | 11/2002 | Lang et al. | 385/31 |
| 6,483,973 B1 | * | 11/2002 | Mazzarese et al. | 385/123 |
| 6,603,905 B1 | * | 8/2003 | Ionov | 385/39 |
| 6,704,479 B2 | * | 3/2004 | Koplow | 385/31 |

FOREIGN PATENT DOCUMENTS

JP          63135905 A  *  6/1988  ............ G02B 6/30

OTHER PUBLICATIONS

U.S. Appl. No. 60/331,149.*

* cited by examiner

*Primary Examiner*—Jennifer Doan
(74) *Attorney, Agent, or Firm*—Andrews Kurth LLP

(57) ABSTRACT

A method and a corresponding apparatus for side-coupling light into an optical waveguide, such as a double-cladding fiber, are described. The method includes emitting light from a light source and coupling the emitted light into a side of a waveguide that defines a slit disposed on the side of the waveguide at an angle relative to an axis of the waveguide. The emitted light is incident on a surface of the slit and the slit surface reflects the incident light into the waveguide.

33 Claims, 9 Drawing Sheets

METHOD AND APPARATUS FOR COUPLING LIGHT INTO A WAVEGUIDE USING A SLIT

RELATED APPLICATIONS

This application claims the priority of U.S. Provisional Application Ser. No. 60/331,149, entitled "A Method And Apparatus Of Coupling Light Into A Double Cladding Fiber Using A Slit" and filed Nov. 9, 2001, which is hereby incorporated by reference. This application also incorporates by reference U.S. patent application Ser. No. 09/733,988, now U.S. Pat. No. 6,603,791, entitled "High Power Fiber Amplifiers With Passive Pump Module Alignment" and filed Dec. 12, 2000, U.S. patent application, Ser. No. 09/790,614, now U.S. Pat. No. 6,529,657, entitled "Angle Selective Side-Pumping Of Fiber Amplifiers And Lasers" and filed Feb. 23, 2001, U.S. patent application Ser. No. 09/994,788, now U.S. Pat. No. 6,717,720, entitled "Hermetic Pump Module For Double Cladding Fiber Amplifiers And Method For Making Same" and filed Nov. 28, 2001, and U.S. patent application Ser. No. 09/722,271, now U.S. Pat. No. 6,608,951, entitled "Optical fiber amplifiers and lasers and optical pumping device therefore" and filed Nov. 28, 2000.

TECHNICAL FIELD

The technical filed is optical fiber communications systems, optical fiber amplifiers and optical fiber lasers.

BACKGROUND

Double cladding fibers (DCF's) offer a practical means for constructing high power fiber amplifiers and fiber lasers. In DCF's, pump light propagates in a large (typically 50–500 μm diameter) inner cladding that surrounds a smaller (typically 3–20 μm diameter) core that can doped with the active dopant such as Er, Yb, Tm, Nd, or Pr. The inner cladding is surrounded by a low refractive index outer cladding and functions as a low loss waveguide for the pump light. The relatively large inner cladding allows high power, low spatial coherence pump sources such as broad area lasers, diode bars or fiber-coupled diode bars, to be efficiently coupled into it. The power that can be coupled from such sources into a fiber is proportional to $aNA^2$, where a is the fiber inner cladding cross-sectional area and NA is inner cladding numerical aperture. The power can be maximized by reducing the refractive index of the outer cladding to increase NA, by using low refractive index polymers, resulting in NA's of 0.35–0.6.

Four primary methods for coupling of light into DCFs currently are used: i) end-fire, with pump light directly coupled through the end of the DCF, ii) tapered fused fiber coupler, with the pump light coupled through a multimode fiber fused to the DCF, iii) tapered fiber bundle, with pump light coupled through multiple fibers fused to the DCF, and v-groove side-coupling, with the pump light coupled into the DCF by total internal reflection (TIR) from a 45° facet of a v-groove cut into the inner cladding.

V-groove coupling is typically implemented as shown in FIG. 1. The DCF fiber is first mounted on a transparent substrate (for mechanical strength) using a transparent, low refractive index adhesive, which required to maintain optical guiding in the inner cladding. A micro-lens collects the widely diverging laser diode emission, and then re-focuses the emission onto the 45° v-groove facet, where TIR at the air-glass boundary couples the light into the fiber. To assure pump capture in the inner cladding, the incident cone of light from the micro-lens must have a numerical aperture that is smaller than the NA of the DCF. While in the configuration of FIG. 1 the broad stripe diode is oriented with the stripe parallel to the fiber axis, diode orientation with the stripe perpendicular to the axis can also be used.

Compared with the other methods, the v-groove technique offers the advantages of small size, negligible loss for the signal in the core, low cost, and very high pump coupling efficiency. Small size is particularly important because it allows the integration of a pump diode and the DCF coupling means into a single compact package, which can be hermetically sealed. V-groove coupling, however, also has significant deficiencies, limiting V-groove coupling use for many commercial applications. These deficiencies are described below.

1. Requirement for a Low Refractive Adhesive: Poor Mechanical Strength.

This represents a significant limitation since all optically transparent low refractive index optical adhesives have low mechanical strength. All such adhesives are in the form of soft polymers or silicones that do not produce a strong bond between the fiber and the glass substrate, creating the possibility that the fiber will move, causing a drop in pump coupling efficiency.

2. Requirement for a Low Refractive Adhesive: Low Optical Damage Level.

Focused pump light propagates through the low refractive index adhesive, subjecting the adhesive to a high optical intensity. Since optical damage levels for such adhesives are orders of magnitude lower than glass, optical damage to the adhesive can occur. Such damage can be immediate, causing burning of the adhesive and damage to pump diode and micro-lens, or can occur over a long time leading to a slow decrease in the transmission and pumping efficiency, eventually producing a runaway pump absorption effect causing complete destruction of the v-groove.

3. Limited Tolerance for Positioning of the Diode and the Micro-Lens.

A large distance from the laser diode facet to the v-groove requires that the micro-lens magnification M (approximately equal to the ratio of lens-to-focused-spot distance divided by the lens focal length) be large (typically 10×). As a result, any change in the diode or lens lateral position results in an M times larger change in the focused spot position, leading to a very limited alignment tolerance for the diode and the lens. Although increasing the lens focal length reduces M, increasing the lens focal length requires the lens overall size be increased significantly, thereby increasing the overall package size.

4. Unsuitability for Lens-Less Coupling.

By eliminating the high precision micro-lens, the cost of a side-coupling arrangement can be reduced significantly not only because of elimination of this costly element, but also because the alignment procedure for two elements (diode and fiber) is significantly simpler and easier to automate than the alignment procedure for three elements (diode, lens, and fiber). In addition, the elimination of the high magnification lens significantly increases the alignment tolerance, leading to a lower cost and more robust pump diode-DCF pump coupler package. Unfortunately, v-groove coupling is unsuitable for lens-less coupling.

The unsuitability of prior art v-groove couplings for lens-less side coupling can be explained with reference FIG. 2. With no lens, the diode is placed in close proximity to the top surface of the DCF, as shown in FIG. 2. The minimum distance h between the diode facet and middle point of the v-groove facet is given by the sum of the clearance distance between the substrate and the diode facet, substrate thickness t, adhesive layer thickness, and approximately ¾ of the fiber diameter. To provide sufficient mechanical strength, t is typically >200 μm. Assuming a diode-fiber clearance distance of 20 μm (to insure that the substrate does not contact the diode) adhesive thickness of 10 μm, a substrate thickness of 200 μm, and a typical fiber diameter of d=125 μm, the total diode-to-v-groove distance is h=323 μm. If a broad area laser diode with a stripe width of w=50 μm and a divergence of 12° (8° in glass) in the junction plane is used, the pump beam will expand to approximately a width of 97 μm at the mid-point of the v-groove facet. For a 90° v-groove with a 52 μm vertical depth, the maximum allowed vertical depth in such a fiber to avoid penetrating into the evanescent field of a 5–10 μm diameter core, the v-groove facet width is 52 μm. Therefore, the 97 μm wide beam significantly spills over the v-groove facet, lowering pump coupling efficiency. While a larger fiber diameter allows a larger v-groove width, the larger fiber diameter undesirably decreases the pump absorption in the fiber, in turn, undesirably requiring a longer fiber to fully absorb the pump light. Additionally, the smaller pump intensity resulting from such a larger cladding reduces population inversion of the active dopant, leading to larger thresholds and less uniform gain distribution.

Although one example of a v-groove coupling seen in FIG. 6 of U.S. Pat. No. 5,854,865 does allow lens-less coupling with a laser diode placed above the open side of the v-groove, this example does not rely on TIR. Instead, to achieve high reflectivity, this example requires that the v-groove surface have a reflective coating. Such thin film mirror deposition on the v-groove facet (the film must not be deposited on other fiber surfaces to avoid introducing loss for the pump light in the inner cladding) is so difficult to implement as to make it commercially impractical. In addition, this form of lens-less v-groove coupling does not make it possible to take advantage of the cylindrical lens effect formed by the surface of a round fiber.

In summary, there is a need to increase coupling efficiency of light from pump sources having a large divergence and width into optical waveguides such as double cladding fibers, while reducing the complexity and cost, eliminating low optical damage materials from the optical path of the pump beam, and minimizing the inner cladding diameter to achieve high pump intensity in the fiber, in order to optimize fiber amplifier and laser performance.

SUMMARY

Embodiments described herein overcome limitations and disadvantages of the prior art. Advantages include increased coupling efficiency from pump sources with large divergence and width, reduction of complexity and cost, elimination of low optical damage materials from the path of the pump beam, and minimizing of inner cladding diameter to achieve high pump intensity. These advantages optimize fiber amplifier and laser performance. Other advantages are apparent from the description below.

These and other advantages are achieved, for example, by a method for coupling light into an optical waveguide. The method includes emitting light from a light source and coupling the emitted light into a side of a waveguide that defines a slit disposed on the side of the waveguide at an angle relative to an axis of the waveguide. The emitted light is incident on a surface of the slit and the slit surface reflects the incident light into the waveguide.

These and other advantages are also achieved, for example, by an apparatus for coupling light into an optical waveguide. The apparatus includes a waveguide that defines a slit disposed on a side of the waveguide at an angle relative to an axis of the waveguide and a light source arranged to couple light into the side of the waveguide. Light from the light source is incident on a surface of the slit and the slit surface reflects the incident light into the waveguide.

Likewise, these and other advantages are also achieved, for example, by an optical pumping device. The optical pumping device includes a light guiding section including a cladding layer surrounding a fiber core, the cladding layer defining a slit disposed on a side of the light guiding section at an angle relative to an axis of the light guiding section.

Moreover, these and other advantages are also achieved, for example, by a double- cladding fiber that includes a core and an cladding, surrounding the core, wherein the cladding defines a slit disposed on a side of the double-cladding fiber at an angle relative to an axis of the double-cladding fiber.

Additionally, these and other advantages are also achieved, for example, by fiber amplifiers and laser that comprise the above-described apparatus, optical pumping device or double-cladding fiber.

DESCRIPTION OF THE DRAWINGS

The detailed description will refer to the following drawings, wherein like numerals refer to like elements, and wherein.

DETAILED DESCRIPTION

Figure 1:
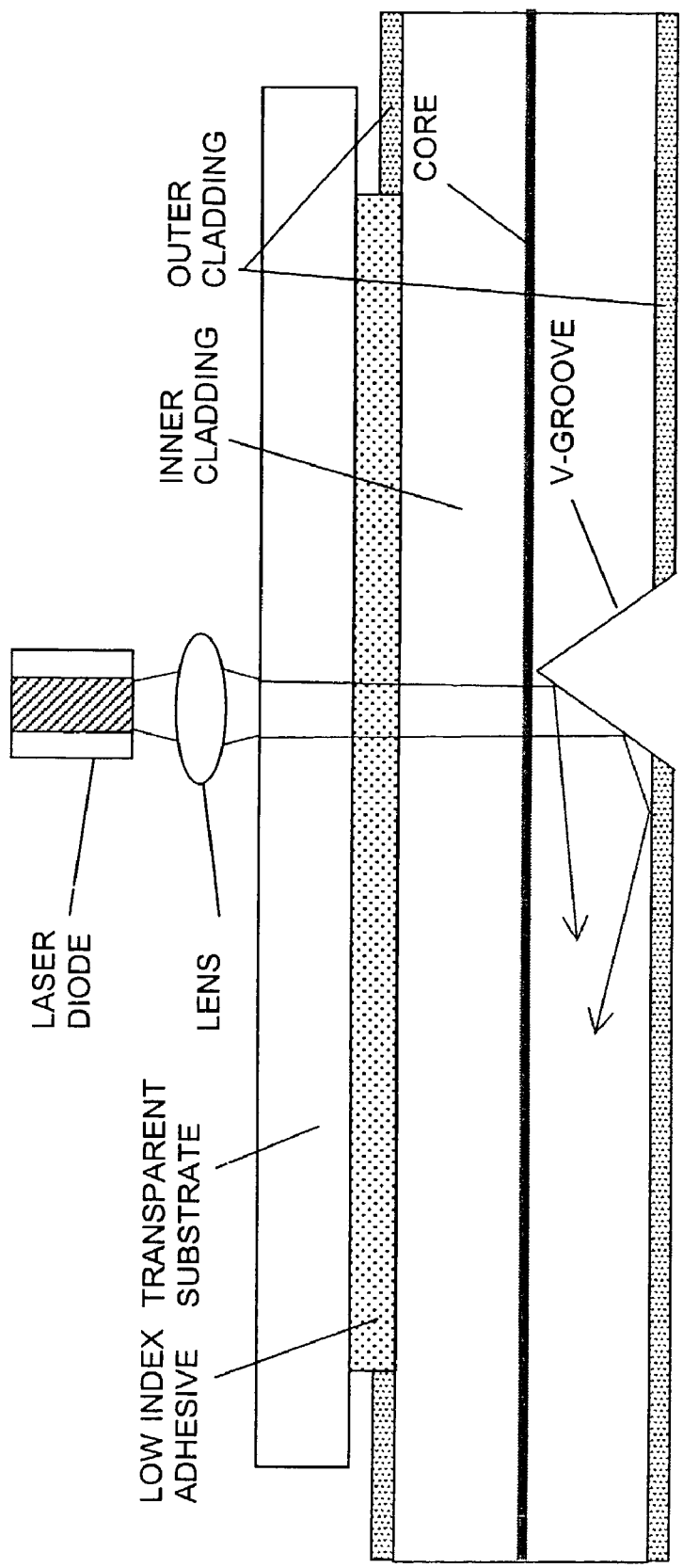
FIG. 1 is a diagram showing a prior art example of v-groove side coupling using a lens.
Figure 2:
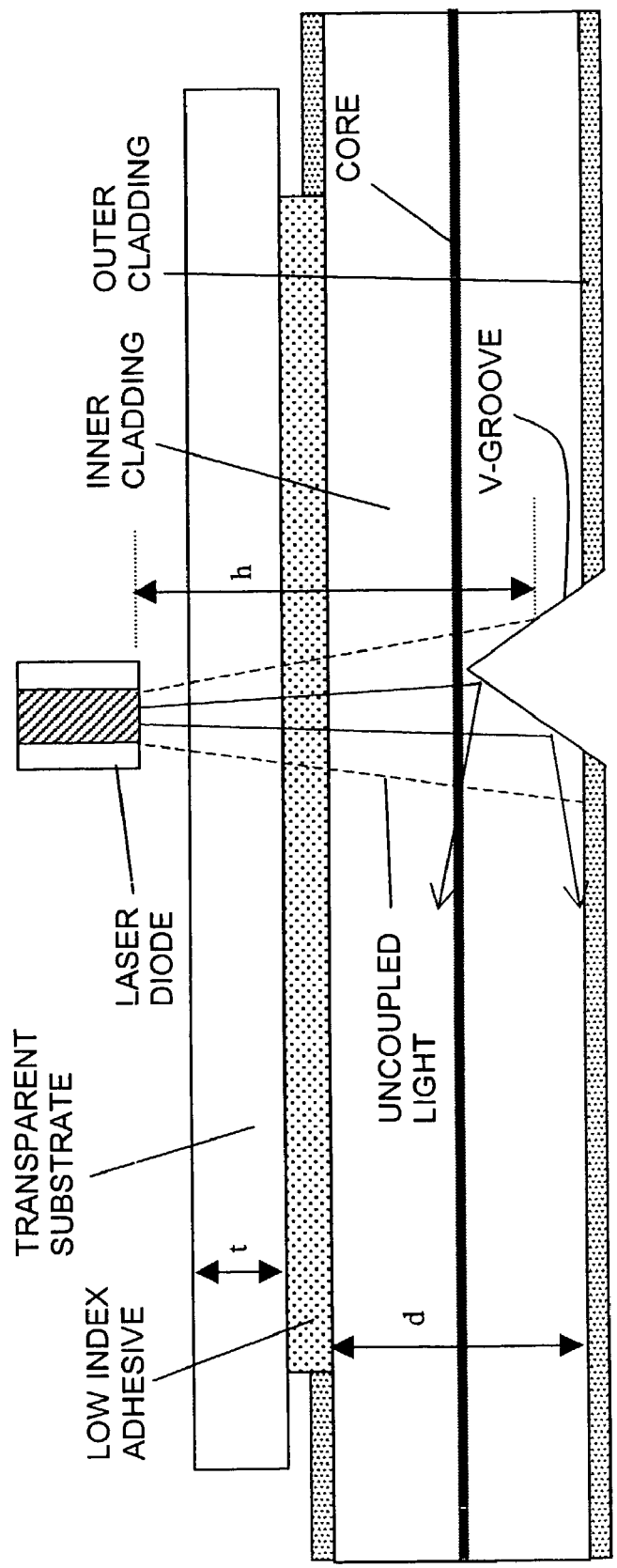
FIG. 2 is a diagram showing a prior art example of v-groove side coupling without a lens.
Figure 3:
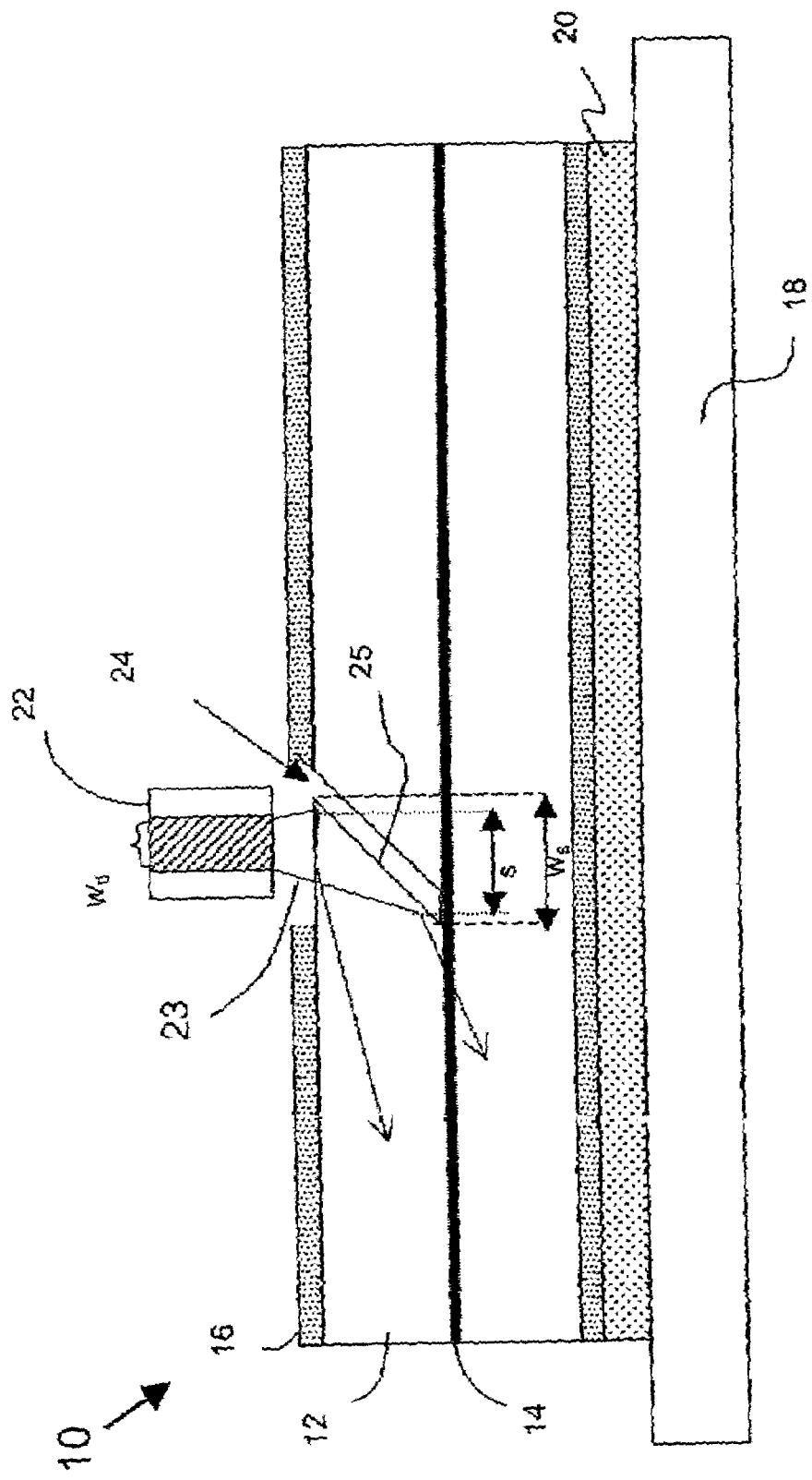
FIG. 3 is a diagram showing an embodiment of an apparatus for coupling light using a slit.

Current v-groove side-coupling deficiencies are overcome by an apparatus and method of side-coupling using slits fabricated into an optical waveguide, an embodiment of which is illustrated by FIG. 3. In the embodiment shown, a fiber 10, which includes an inner cladding 12, a core 14, and an outer cladding 16, is mounted on a substrate 18 with an adhesive 20. In this example, the fiber 10 is a double-cladding fiber (DCF). A pump source 22 that emits pump light 23 is positioned on a side of the fiber 10 in which a slit 24 is formed. The pump light 23 is incident onto the side of the fiber 10 and the pump light 23 is total internal reflection (TIR) reflected at the slit surface 25. The slit 24 is disposed at an angle that optimizes coupling efficiency for the incident pump light, typically approximately 45° relative to the fiber axis, and is positioned on the same side of the fiber as the pump source 22.

The slit 24 can be micro-machined (or otherwise fabricated) into the inner cladding 12, and preferably penetrates as deeply as possible into the inner cladding 12 without perturbing light propagating in the single or multimode mode core 14 of the fiber 10. The slit 24 is preferably left unfilled in order to maintain a large refractive difference at the slit surface-air boundary 25, allowing TIR over a maximum angular range (for a silica-air interface, the maximum TIR incidence angle is 43° relative to the surface normal). After reflection at the slit surface-air boundary 25, the pump light 23, preferably generated by a broad stripe diode pump source 22, is coupled into the inner cladding 12 of the fiber 10. The outer cladding 16 may be composed of various materials, including glass, low-index polymer, or air. Since the outer cladding 16 can remain un-stripped on one side, the fiber 10 can be bonded on its backside to any substrate 18 using any high strength epoxy or adhesive 20, without need for optical transparency of the substrate 18 or the adhesive 20.

When compared with the v-groove approach, the slit coupling method and apparatus has the following important advantages:

1. No low refractive index transparent adhesive. The requirement for such an adhesive is eliminated since the fiber 10 can be bonded on its back-side (see FIG. 3), where the outer cladding 16 remains un-stripped, using any high strength adhesive 20. The need for a transparent substrate 18 is also eliminated, making it possible to bond the fiber 10 to a low cost metal holder or other inexpensive opaque substrate.

2. No adhesive in optical path. Since the pump light 23 propagates directly from the pump source 22 (e.g., a diode) into the fiber 10, there is no low optical damage material in the optical path (i.e., the path of the pump light 23). This avoids long term degradation problems associated with a transparent adhesive used in v-groove coupling.

3. Small diode-to-fiber distance. Since the slit 24 is on the same side as the pump source 22, the pump source-to-fiber distance is much shorter than for v-groove coupling. For a configuration that uses a lens to collect pump light from a pump source 22 and focus the pump light onto the slit 24, the short pump source-to-fiber distance allows the use of a lens with low magnification M, resulting in a significantly larger alignment tolerance than is possible with v-groove coupling.

4. Suitability for lens-less coupling. The short distance from the facet of the pump source 22 to the slit surface 25 makes it possible to achieve efficient coupling without the use of a focusing lens. Using the embodiment of FIG. 3 with a diode pump source 23, and assuming 125 μm fiber diameter, a 20 μm diode-to-fiber distance, a 52 μm slit depth, and a 45° slit angle relative to fiber 10 axis, the pump light 23 beam spreads to a width s=58 μm (see FIG. 3). The amount of pump light 23 spillover with this beam size is sufficiently small (~10%) to still allow high coupling efficiency, unlike the case with lens-less coupling with a v-groove. To eliminate the remaining ~10% pump loss, only a small increase in the inner cladding 12 diameter and slit 24 depth is required.

5. Use of multiple slits to increase allowable laser diode stripe width. As explained below, a configuration with multiple slits 24 positioned on opposite sides of the fiber 10 makes it possible to use a laser diode, or other pump source 22, with two times wider active stripe than would be possible with a v-groove coupling. This multiple slit configuration translates into a significant increase of the output power available from a single laser diode fiber amplifier or laser.

In addition to these immediately apparent advantages of slit side-coupling versus v-groove coupling, there are other important benefits that are realized from additional embodiments described below.

Different embodiments of the slit side-coupling method are shown in FIGS. 3–9, in which a broad stripe diode laser is chosen as the pump source 22 for illustrative purposes. For generality, the diode's orientation is shown to be with the junction (i.e., active stripe) parallel to the fiber axis, but other diode orientations may also be used. The angle of the slit 24 is assumed to be approximately 45°.

As discussed above, FIG. 3 shows the simplest slit side-coupling configuration, in which pump light 23 from a broad stripe diode pump source 22 directly impinges on the slit surface 25 of the slit. For efficient coupling, a diode with a stripe width $w_d$ that is equal or slightly smaller than the width $w_s$ of the slit 24 is preferably used. For a fiber with a 125 μm inner cladding 12, this corresponds to a maximum diode stripe width $w_d$ of approximately $w_d$~50 μm. While pump light 23 beam divergence in the junction plane is relatively small, divergence in the perpendicular plane is large, typically characterized by a Gaussian angular distribution with a 30–40° full width at half maximum. If no lens is used to decrease this divergence, a fiber 10 with an inner cladding 12 NA>0.6 is required to fully capture the emission. When a fiber 10 with a round inner cladding 12 is used in the coupling configuration of FIG. 3, the circular shape of the fiber 10 surface can function as a cylindrical lens that reduces divergence of the pump source 22 emission in the plane perpendicular to the junction with the slit 24. This lens effect significantly increases coupling efficiency for highly divergent emissions generated by broad area diodes.

Figure 4:
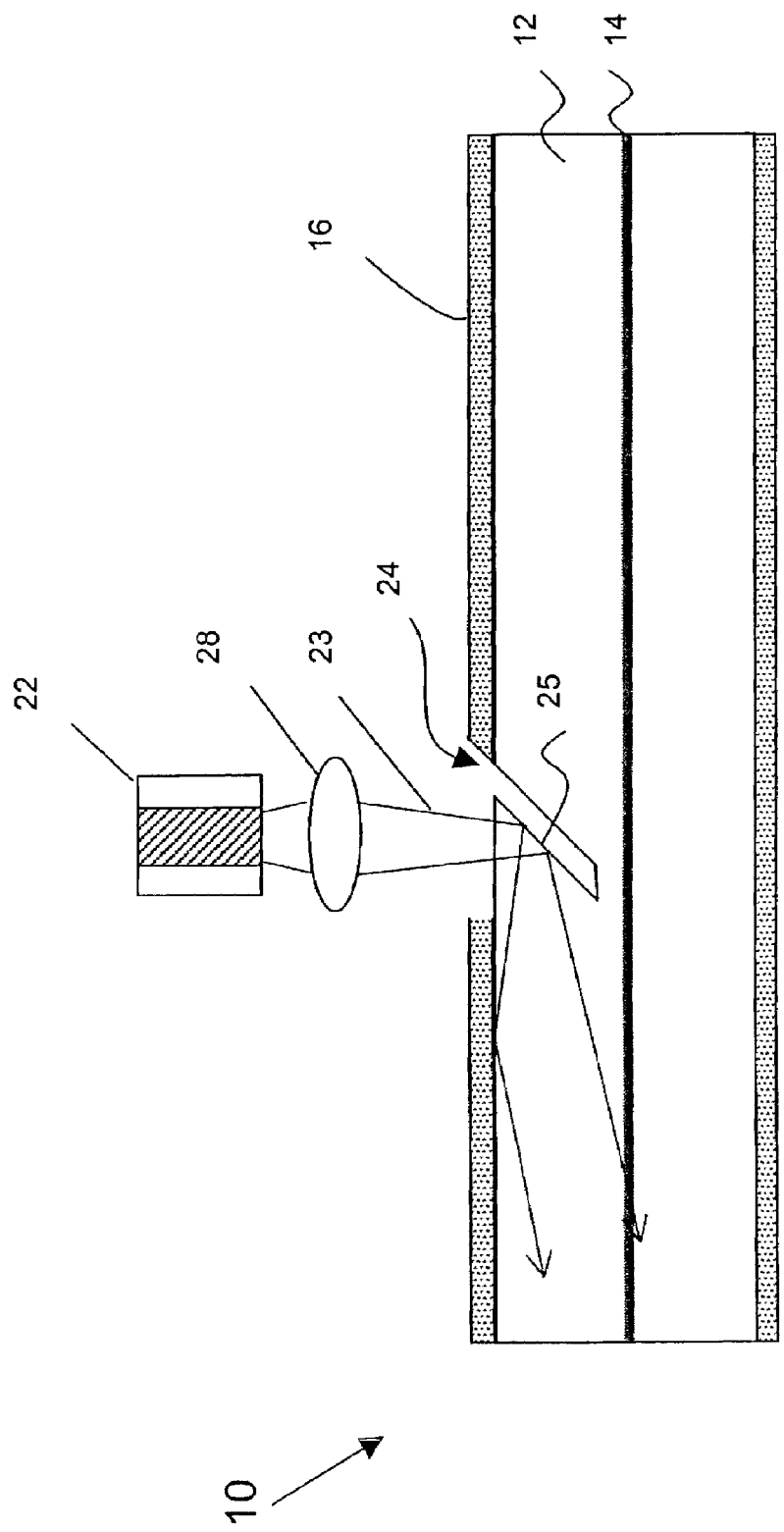
FIG. 4 is a diagram showing an embodiment of an apparatus for coupling light using a slit and using a lens.

FIG. 4 illustrates a slit coupling arrangement that makes use of a micro-lens 28 to collect the pump light 23. The micro-lens 28 collects the diode emission (the pump light 23) and re-focuses the emission onto the slit surface 25, where the pump light 23 is TIR reflected into the fiber 10. Despite increasing the overall complexity of the arrangement, the inclusion of the micro-lens 28 makes it possible to use stripe widths $w_d$ larger than the slit 24 width $w_s$. The micro-lens 28 can function to de-magnify (M<1) the diode emission area, producing a focused pump light 23 beam that is smaller that the stripe width $w_d$ by the magnification factor M. The maximum allowed de-magnification factor 1/M is limited by the brightness conservation principle, which states that $w_d NA_d$=w'NA', where w' is the width of the focused beam, $NA_d$ is the numerical aperture of the emitted pump light beam and NA' is the numerical aperture of the focused pump light beam, all measured in the diode junction plane. The maximum allowed NA' should be smaller than the fiber 10 NA. In addition, to achieve TIR at the slit surface 25, all light should be incident at angles shallower than 43° relative to the slit surface 25 normal (for a silica glass fiber 10). This means that incident light is contained within an angular range corresponding to approximately ½ of the fiber NA. For a typical 12° in-junction-plane diode divergence, corresponding to an NA=0.11, a fiber 10 with an inner cladding 12 NA=0.45 will allow a maximum de-magnification factor of 1/M~2. For a 125 μm fiber 10 with a slit 24 width of $w_s$=52 μm this allows a maximum diode stripe width of $w_d$ approximately equal to 100 μm, representing a factor of 1.5–2 increase in the available pump power compared with a $w_d$=50 μm diode (output power does not scale proportionately with $w_d$ because of excess heat generated at the stripe center) that would have to be used for a lens-less slit coupling.

Figure 5:
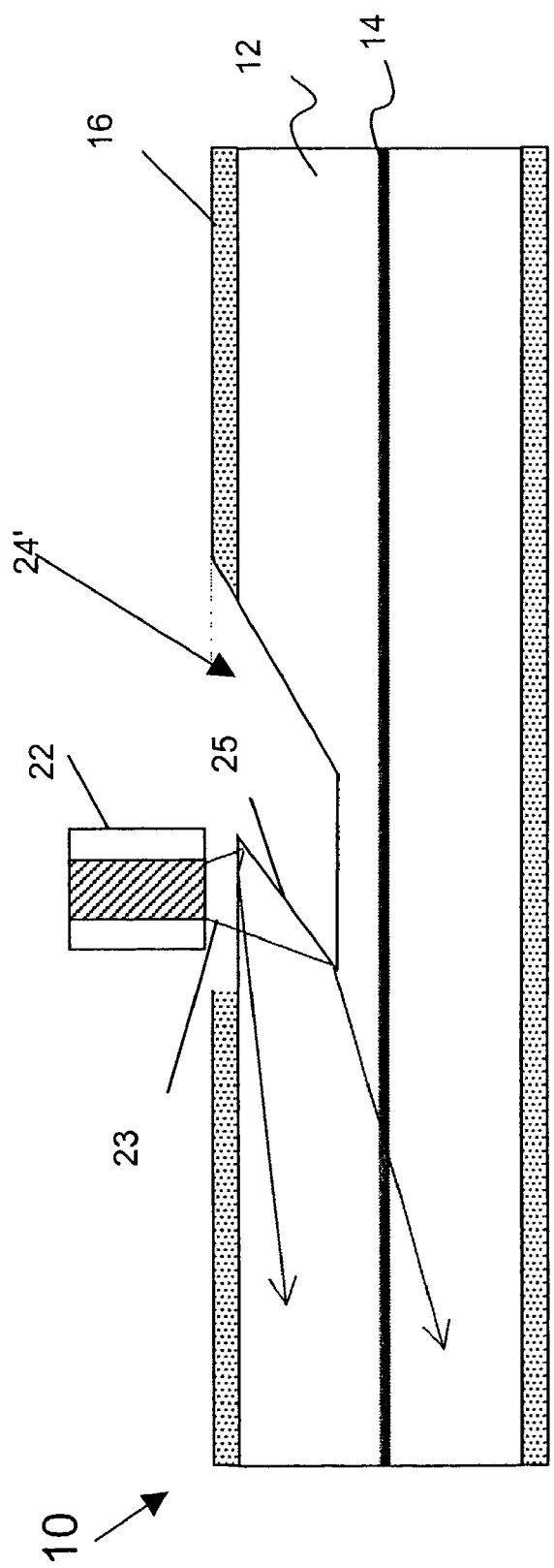
FIG. 5 is a diagram showing an embodiment of an apparatus for coupling light using a wide slit.

A lens-less slit coupling arrangement is shown in FIG. 5. The arrangement is similar to that of FIG. 3 except that a wide slit 24' is used. The wide slit 24' functions in the same manner as the narrow slit 24. The wide slit 24' illustrates that any fabrication method can be used to make the slit, even if the fabrication method does not result in a narrow width slit 24. Fabrication methods might include mechanical cutting or polishing with appropriately shaped tools, laser ablation with a focused beam of appropriate wavelength and size, or ion beam milling, for example.

Figure 6A:
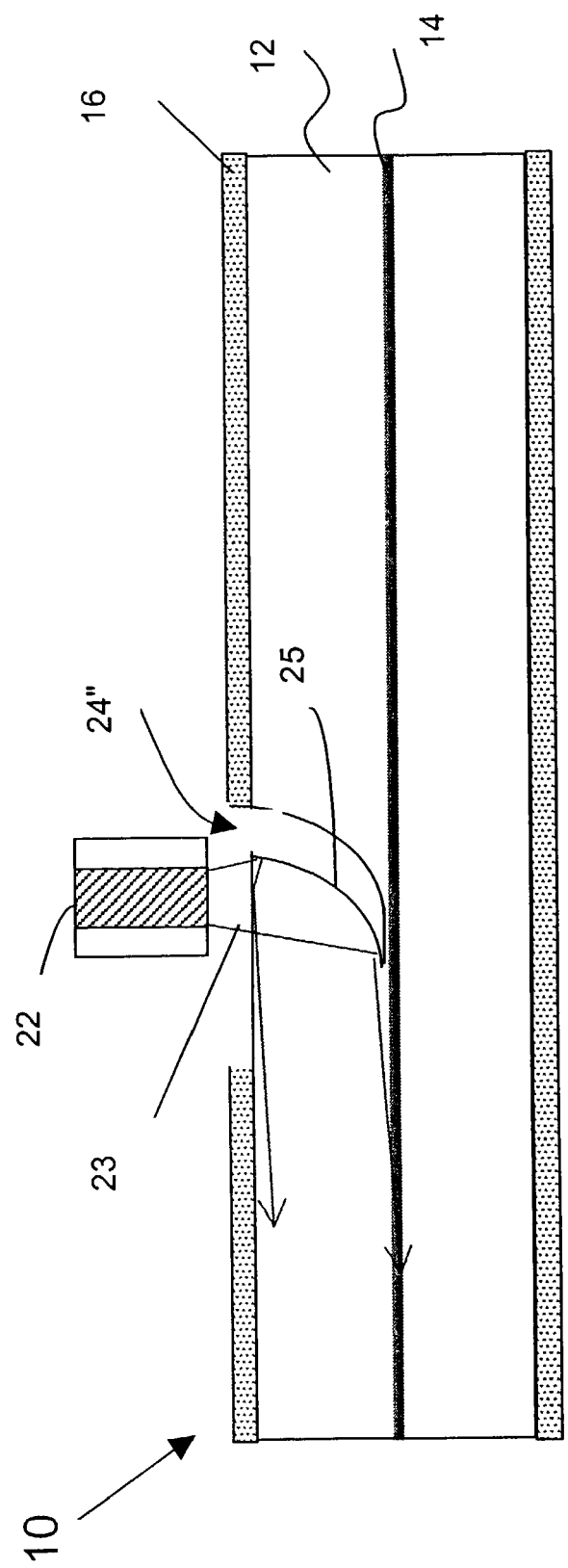
FIGS. 6A and 6B are diagrams showing an embodiment of an apparatus for coupling light using a curved slit.
Figure 6B:
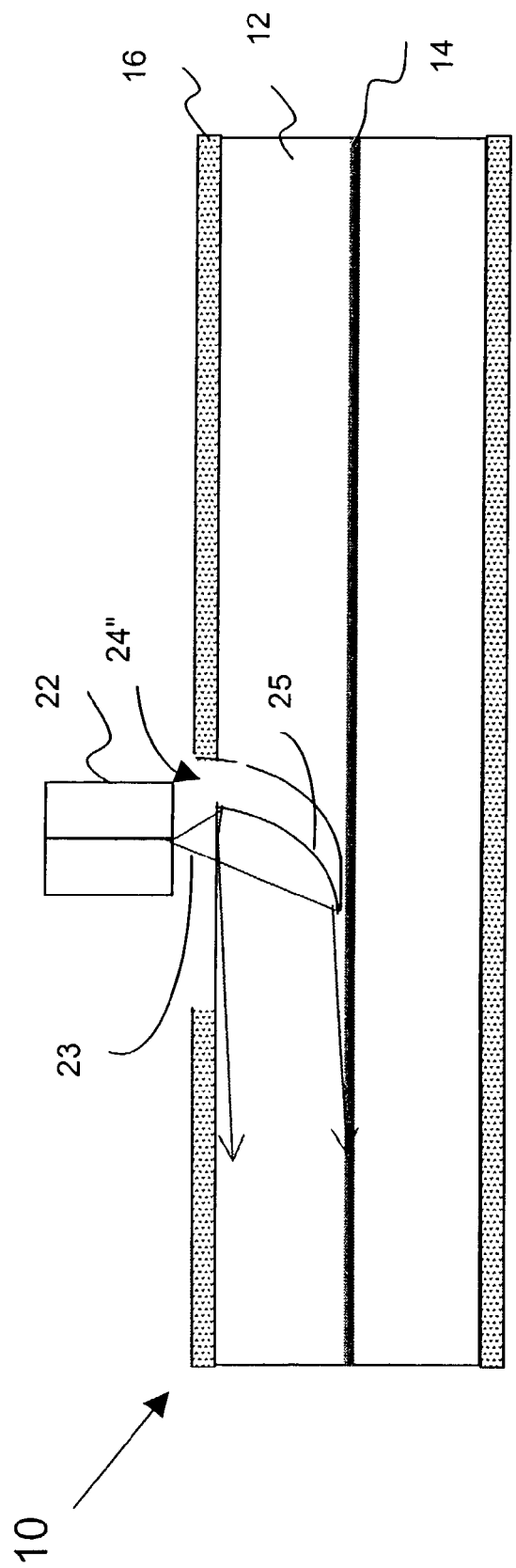

FIGS. 6A–6B illustrate a fiber 10 with a curved slit 24". Such a curved slit 24" can be fabricated using a laser ablation technique or ion beam milling, with the laser or ion beam incident from a direction perpendicular to the fiber 10 axis. The curved slit 24" causes partial collimation of the laser diode, or other pump source 22, emission, making it possible to intercept a wider beam. For a diode orientation with the junction perpendicular to the fiber 10, a 30–40° wide beam divergence requires a fiber 10 with an impractically large NA. The curved slit 24" functions as a lens that reduces diode beam divergence for this diode orientation, as shown in FIG. 6B. Accordingly, the curved slit 24" allows such a wide divergence diode, or other wide divergence pump source 22, to be used in a perpendicular arrangement as shown in FIG. 6B.

Figure 7:
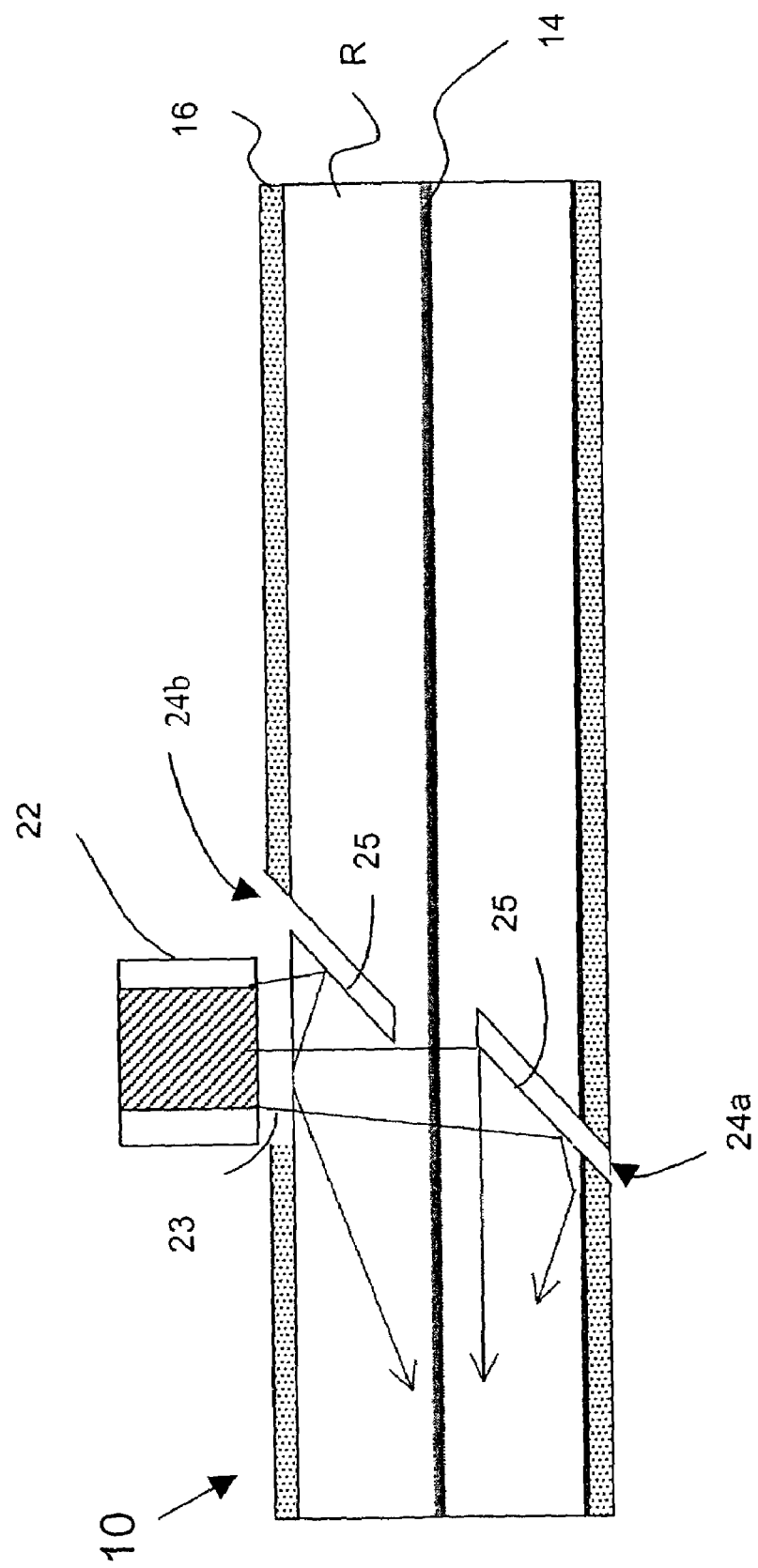
FIG. 7 is a diagram showing an embodiment of an apparatus for coupling light using two slits in proximity.

A fiber 10 with a double slit arrangement, in which two slits 24a and 24b are positioned on opposite sides of the fiber 10, with a small overlap of the slits 24a and 24b in the direction along fiber axis, is illustrated in FIG. 7. Such an arrangement allows the diode stripe, or other pump source 22, width to be two times greater that that allowed with a single slit or with v-groove coupling. This allows higher-powered laser diodes, or other higher powered pump sources 22, to be used. Higher-powered pump sources 22 enable the fiber 10 to be used for higher-powered fiber amplifiers and lasers, for example.

Figure 8:
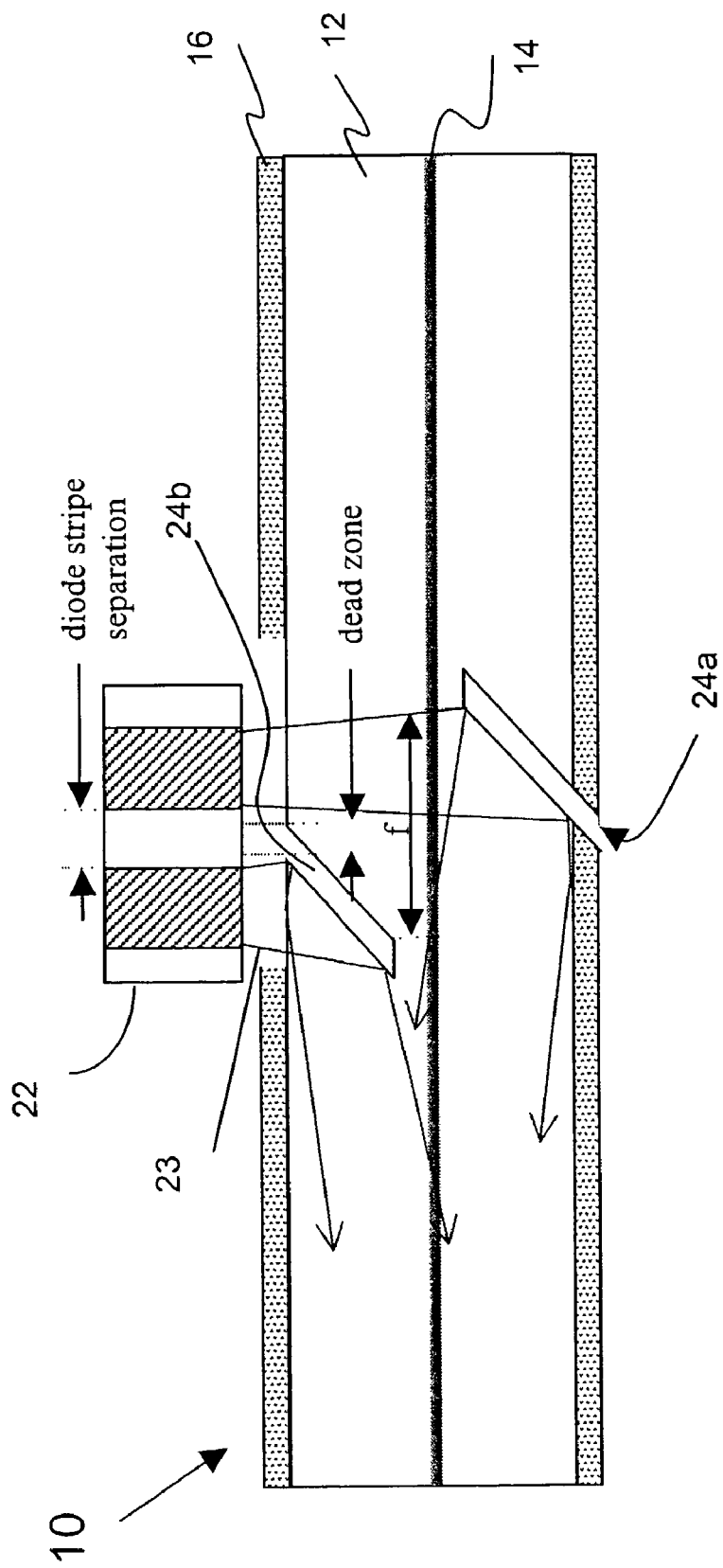
FIG. 8 is a diagram showing an embodiment of an apparatus for coupling light using two separated slits.

FIG. 8 shows a second type of double slit arrangement, with slits 24a and 24b separated by a greater distance than in the embodiment shown in FIG. 7. This increases fiber strength in the region between the slits 24a and 24b. The configuration of FIG. 8 has a "dead zone," equal to the width of the slit 24b where the slit 24b intercepts the side surface (the surface at the top of FIG. 8) of the fiber 10, in which incident pump light is not reflected into the inner cladding 12. To avoid this pump loss, a laser diode with two broad area active stripes separated by a distance greater than the dead zone, or another pump source 22 with a similar configuration, is preferably used, as shown in FIG. 8. The electrically inactive area between the two stripes of the laser diode also improves laser diode heat dissipation, allowing larger output powers than possible with one contiguous stripe that has the same width as the combined width of the two narrower stripes. The slit separation f between the slits 24a and 24b must be sufficiently small so that the pump beam reflected by the first slit 24a is not intercepted by the second slit 24b. For a pump light 23 beam divergence of 8° inside the fiber 10, and a vertical distance of 20 $\mu$m between the bottom of the second slit 24b and the top of the first slit 24a, the maximum allowed slit separation is f=286 $\mu$m.

To decrease the approximate 4% pump loss caused by Fresnel reflection of the pump light 23 propagating through the fiber 10 surface, the fiber surface facing the pump source 22 is preferably anti-reflection coated. To scale the available pump power beyond what is available from a single laser diode, multiple slits 24 and pump sources 22 can be placed along the length of the fiber 10, with each slit 24 coupling light from a corresponding pump source 22. In order to avoid out-coupling of pump light 23 by nearest-neighbor slits 24, the slits 24 must be separated by sufficient (several absorption lengths) distances from each other so that pump light 23 injected by one slit 24 is nearly completely absorbed before it reaches the adjacent slit 24.

All of the above slit-coupling configurations provide an efficient, compact, and cost-effective means for coupling light into optical waveguides, fibers and double cladding fibers. This provides an efficient method of pumping double cladding fibers with cores doped with one, or a combination of rare earth atoms such as Er, Yb, Nd, Tm, Pr, Nd, in a manner that is familiar to those skilled in the art, for the purpose of creating optical gain for signals propagating in the core. In addition to introducing active dopants into the core, the pump light can be introduced in the cladding area that immediately surrounds the core, overlapping with the evanescent field of the light guided in the core. Such fibers, pumped by broad area laser diodes or other pump sources such as fiber-coupled laser diodes and laser diode arrays can be used to construct fiber amplifiers, super fluorescent sources, and fiber lasers using techniques known to those skilled in the art.

What is claimed is:

1. A method for coupling light into an optical waveguide, comprising steps of:
   emitting light from a light source;
   coupling the emitted light into a side of the waveguide, the waveguide defining a slit disposed on the side of the waveguide at an angle relative to an axis of the waveguide, wherein the emitted light is incident on a surface of the slit and the coupling step comprises reflecting the incident light from the slit surface into the waveguide; and
   curving the slit, thereby increasing coupling efficiency.

2. A method for coupling light into an optical waveguide, comprising steps of:
   emitting light from a light source; and
   coupling the emitted light into a side of the waveguide, the waveguide defining a slit disposed on the side of the waveguide at an angle relative to an axis of the waveguide, wherein the emitted light is incident on a surface of the slit and the coupling step comprises reflecting the incident light from the slit surface into the waveguide and wherein the waveguide is the inner cladding of a double cladding fiber.

3. The method of claim 1, further comprising disposing the slit surface to achieve total internal reflection of the incident light.

4. The method of claim 1, wherein the waveguide is an optical fiber.

5. The method of claim 1, wherein the coupling step further comprises focusing the emitted light through a lens disposed between the light source and the slit.

6. The method of claim 1, wherein:
   the light source is a spatially extended light source;
   the waveguide defines a plurality of slits; and
   the emitted light is incident on surfaces of the plurality of slits.

7. The method of claim 1, wherein the light source is a broad area laser diode.

8. The method of claim 1, wherein the light source is a laser diode with a plurality of active stripes.

9. The method of claim 1, wherein the double cladding fiber includes a core doped with an active dopant to achieve optical gain.

10. The method of claim 9, wherein the double cladding fiber is an optical amplifier.

11. The method of claim 9, wherein the double cladding fiber is a fiber laser.

12. The method of claim 9, wherein the double cladding fiber is a laser.

13. The method of claim 9, wherein said core is doped with one or multiple active dopants selected from Er, Yb, Tm, Nd, Pr.

14. The method of claim 1, wherein:
the emitting step emits light from a plurality of light sources;
the waveguide defines a plurality of slits disposed along the waveguide axis;
the emitted light is incident on surfaces of the plurality of slits; and
the coupling step couples the incident light from the plurality of light sources into the waveguide.

15. An apparatus for coupling light into an optical waveguide, comprising:
the waveguide, wherein the waveguide defines a slit disposed on a side of the waveguide at an angle relative to an axis of the waveguide; and
a light source arranged to couple light into the side of the waveguide, wherein light from the light source is incident on a surface of the slit and the slit surface reflects the incident light into the waveguide and wherein the slit is curved thereby increasing coupling efficiency.

16. An apparatus for coupling light into an optical waveguide, comprising:
the waveguide, wherein the waveguide defines a slit disposed on a side of the waveguide at an angle relative to an axis of the waveguide; and
a light source arranged to couple light into the side of the waveguide, wherein light from the light source is incident on a surface of the slit and the slit surface reflects the incident light into the waveguide and wherein the waveguide is the inner cladding of a double cladding fiber.

17. The apparatus of claim 16, wherein the slit surface is disposed at an angle to the incident light so as to achieve total internal reflection of the incident light.

18. The apparatus of claim 16, wherein the waveguide is an optical fiber.

19. The apparatus of claim 16, further comprising a lens disposed between the light source and the slit.

20. The apparatus of claim 16, wherein:
the light source is a spatially extended light source;
the waveguide defines a plurality of slits;
the emitted light is incident on surfaces of the plurality of slits; and
the slit surfaces reflect the incident light into the waveguide.

21. The apparatus of claim 16, wherein the light source is a broad area laser diode.

22. The apparatus of claim 16, wherein the light source is a laser diode with a plurality of active stripes.

23. The apparatus of claim 16, wherein the double cladding fiber includes a core doped with an active dopant to achieve optical gain.

24. The apparatus of claim 23, wherein said core is doped with one or multiple active dopants selected from Er, Yb, Tm, Nd, Pr.

25. An optical amplifier comprising the apparatus of claim 16.

26. A laser comprising the apparatus of claim 16.

27. The apparatus of claim 15, wherein:
the light source includes a plurality of light sources;
the waveguide defines a plurality of slits disposed along the waveguide axis;
the emitted light from the plurality of light sources is incident on surfaces of the plurality of slits; and
the slit surfaces reflect the incident light into the waveguide.

28. An optical pumping device, comprising:
a light guiding section, the light guiding section comprising a cladding layer surrounding a fiber core, wherein the cladding layer defines a slit disposed on a side of the light guiding section at an angle relative to an axis of the light guiding section and wherein the slit is curved therebyincreasing coupling efficiency.

29. The optical pumping device of claim 28, further comprising a light source arranged to couple light into the side of the light guiding section, wherein light from the light source is incident on a surface of the slit and the slit surface reflects the incident light into the light guiding section.

30. The optical pumping device of claim 28, wherein the light guiding section is a double cladding fiber.

31. A double-cladding fiber comprising:
a core; and
a cladding, surrounding the core, wherein the cladding defines a slit disposed on a side of the double-cladding fiber at an angle relative to an axis of the double-cladding fiber.

32. A method for coupling light into an optical waveguide, comprising steps of:
emitting light from a light source; and
coupling the emitted light into a side of the waveguide, the waveguide defining a slit disposed on the side of the waveguide at an angle relative to an axis of the waveguide, wherein the emitted light is incident on a surface of the slit and the coupling step comprises reflecting the incident light from the slit surface into the waveguide and wherein the waveguide is an inner cladding of a multi-cladded waveguide.

33. An apparatus for coupling light into an optical waveguide, comprising:
the waveguide, wherein the waveguide defines a slit disposed on a side of the waveguide at an angle relative to an axis of the waveguide; and
a light source arranged to couple light into the side of the waveguide, wherein light from the light source is incident on a surface of the slit and the slit surface reflects the incident light into the waveguide and wherein the waveguide is an inner cladding of a multi-cladded waveguide.

* * * * *